Aug. 25, 1931.  C. W. BLOSSOM ET AL  1,820,428
AUTOMOBILE LOCKING MECHANISM
Filed Aug. 13, 1924   2 Sheets-Sheet 1
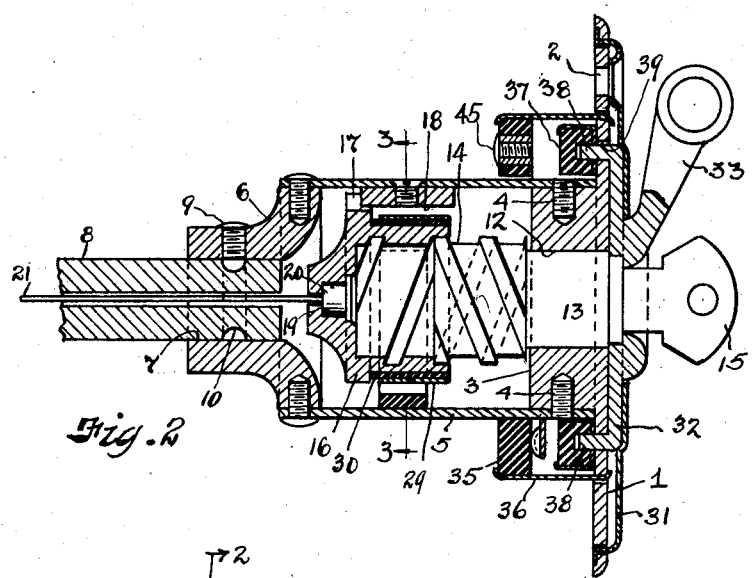
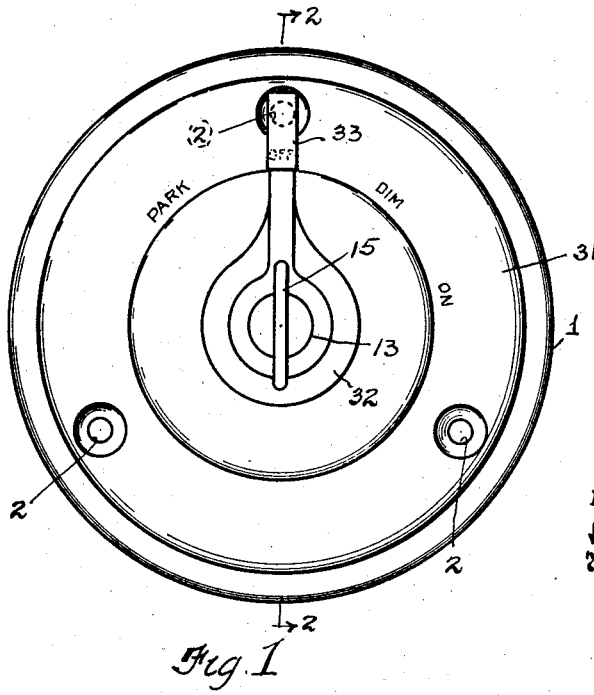
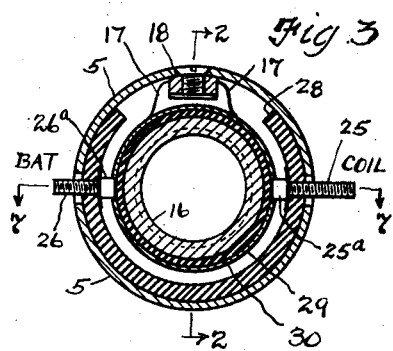
INVENTORS.
Carl W. Blossom and
Elmer C. Peterson
BY
Fay, Oberlin & Fay
ATTORNEYS Aug. 25, 1931.  C. W. BLOSSOM ET AL  1,820,428
AUTOMOBILE LOCKING MECHANISM
Filed Aug. 13, 1924  2 Sheets-Sheet 2

INVENTOR.
Carl W. Blossom and
BY Elmer C. Peterson.
Fay, Oberlin & Fay
ATTORNEYS Patented Aug. 25, 1931

1,820,428

UNITED STATES PATENT OFFICE

CARL W. BLOSSOM AND ELMER C. PETERSON, OF CLEVELAND, OHIO, ASSIGNORS TO THE BLOSSOM LOCK COMPANY, OF CLEVELAND, OHIO, A CORPORATION OF OHIO

AUTOMOBILE LOCKING MECHANISM

Application filed August 13, 1924. Serial No. 731,735.

The present improvements relating, as indicated, to automobile locking mechanism, have more particular regard to the provision of means for conjointly locking the switch controlling the ignition circuit and the transmission mechanism. The object of the invention is to provide a simple and compact device for the purpose stated whereby a single key or permutation controlled element may be utilized to secure an ignition switch of the usual type in open position and to actuate a keeper, for example, in the transmission gear box so as to prevent shifting of the transmission gears. In association with the foregoing we incorporate a switch for controlling the lamps on the automobile so that all of the control devices in question may be assembled into a single unit, thereby not only lowering the cost of manufacture but relieving the instrument board from encumbrance and serving the convenience of the operator.

To the accomplishment of the foregoing and related ends, the invention, then, consists of the means hereinafter fully described and particularly pointed out in the claims, the annexed drawings and the following description setting forth in detail certain mechanism embodying the invention, such disclosed means constituting, however, but one of various mechanical forms in which the principle of the invention may be used.

In said annexed drawings:—

Figure 4:
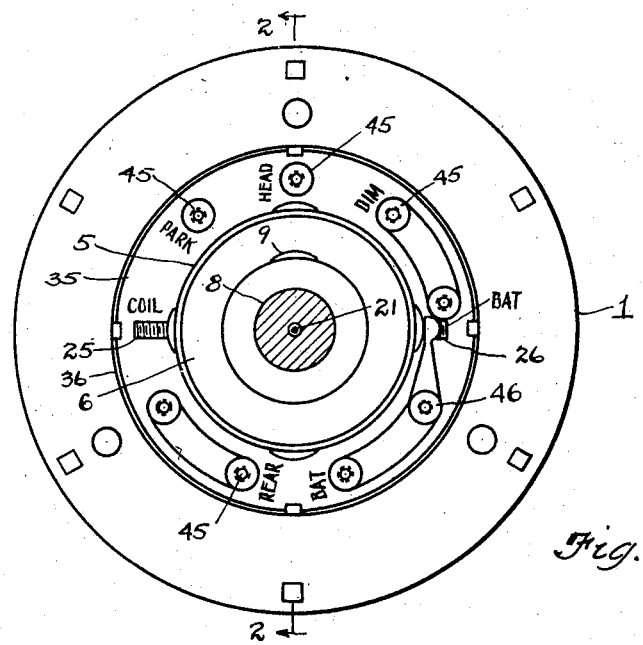
Figures 5, 6:
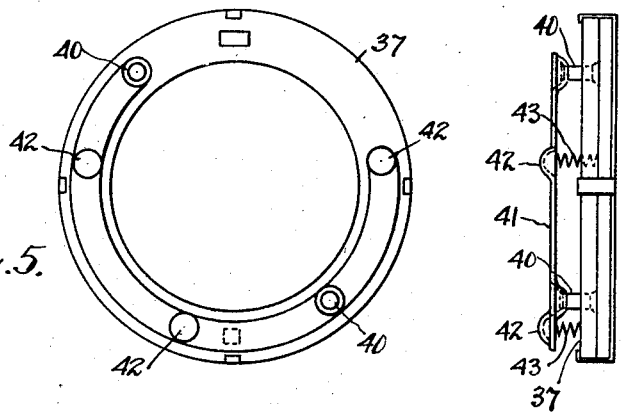
Figure 7:
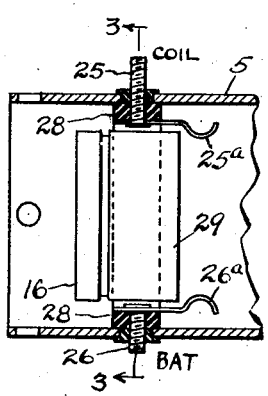

Fig. 1 is a front elevation of our improved locking device or mechanism, showing same as it would appear mounted on the instrument board of an automobile; Fig. 2 is a central longitudinal section of the device, the plane of the section being indicated by the line 2—2, Fig. 1; Fig. 3 is a transverse section of the same, taken on the plane indicated by the line 3—3, Fig. 2; Fig. 4 is a rear elevation of the device, i. e. as viewed from the left in Fig. 2; Fig. 5 is a rear view and Fig. 6 a side elevation of one of the component parts of a lighting switch; and Fig. 7 is a broken longitudinal section taken on a plane at right angles to that of Fig. 2, as indicated by the line 7—7, Fig. 3.

The main supporting element for the various operative parts that compose the device as thus illustrated is a circular plate 1 that is provided with a plurality of circumferentially spaced openings 2 adapted for the reception of screws by means of which such plate may be secured to an instrument board or like support. Projecting from the rear face of plate 1 is an integral boss 3 of general cylindrical form to which is secured, by means of screws 4, a housing 5 of corresponding form. The rear end of this housing is closed by an apertured cap 6, the aperture 7 in such cap being adapted to receive one end of a steel conduit 8. A round nosed screw 9 in the cap engages an annular groove 10 in such conduit end so as to retain such conduit against endwise movement.

Suitably journaled in a central opening 12 in plate 1 and attached boss 3 is a barrel 13 of a lock and rotatably secured to the inner end of such lock is an externally threaded extension 14 that projects approximately half the length of the space within the cylindrical housing 5. As shown, rotation of extension 14 is designed to be effected and controlled by means of a key 15 as in the familiar cylinder type lock, but it will be understood that any other form of key or permutation lock for thus controlling and effecting the rotation of said extension may be employed.

Engaging the threaded extension 14 of lock 13 is an internally threaded shell or nut 16 that is retained against rotative movement but left free to move longitudinally within housing 5 by having radially projecting ears 17 disposed to engage a longitudinally extending guide 18 attached to the inner wall of the housing. Firmly secured in a recess 19 formed in the inner or rear end of the nut member 16, such end being substantially closed, is the head 20 of a wire 21 or equivalent cable member that operates within the conduit 8. The walls of such conduit surround said cable sufficiently closely so as to prevent bending or buckling thereof and thus cause such wire effectively to transmit to any desired point on the automobile such longitudinal movement as may be imparted thereto upon reciprocation of nut 16. Reciprocation of the nut in turn follows upon rotation of the barrel 13, as will be readily understood, the nut in the position shown in Fig. 2 occupying its retracted or rearmost position. Assuming that the wire 21 serves to connect such nut as actuating element with a keeper or equivalent locking element in the gear box of the automobile, or similarly operatively associated with any other portion of the driving mechanism of the automobile, it will be understood that in the position of parts just referred to, such keeper or locking device will be operatively positioned. On the contrary, when the nut 16 is advanced or moved to the right as shown in Fig. 2, as will be the case upon rotation of barrel 13 in a clockwise direction, it will be understood that the corresponding movement imparted to the wire or cable connector 21 will render such keeper or equivalent locking device inoperative. It is deemed unnecessary for the purpose in hand to illustrate such keeper or locking device since the latter will take on various forms, depending upon the particular part of the machine which it is desired to lock. A number of directly operated gear locking devices are at present on the market and any one of these may be utilized with the device in hand, or the keeper or locking device may be associated with the steering column or with a brake or clutch pedal, should this be the preferred scheme for locking the automobile.

As best shown in Figs. 3 and 7, two diametrically oppositely located binding posts 25 and 26 project outwardly through suitable openings in housing 5, such posts being mounted in a segmental block 28 of insulating material that lies within the housing and fills the openings therein through which the posts thus project so as to thoroughly insulate such posts. The outer end of one such post, as indicated on the drawings, is designed to be connected with the battery and the outer end of the other with the coil of the usual ignition system employed in automobiles. The inner ends of these posts carry spring contact members 25a and 26a, respectively, that are adapted in the forward position of the nut 16 to engage with a band 29 of conducting material that surrounds the body of said nut but is insulated therefrom by an intervening layer of insulating material 30. In the retracted position of the nut, as shown in Figs. 2 and 7, the contacts 25a and 26a lie entirely clear of such band 29 so that the ignition circuit in this case is open and it can only be closed by advancing the nut to the right through rotation of the lock barrel 13.

Rotatably secured to the front face of plate 1, by means of an annular stamping 31, is a second annular plate 32 of smaller diameter that constitutes the actuating element for the lighting switch or switches. A radially projecting handle 33 on plate 32 permits such plate to be readily turned into any of the several positions indicated by the designations "Park", "Off", "Dim", "On", that are inscribed on the stamping 31, the latter thus constituting a dial.

The contact members that constitute the lighting switch proper are best shown in Figs. 4, 5 and 6. These members, so far as they are stationary, are carried by a ring 35 of insulating material that surrounds housing 5 and is spaced a short distance from the rear face of plate 1. A supplemental housing 36 encloses the annular space between said insulating ring and the plate, such housing 36 being suitably secured to the ring and plate, as shown in Fig. 2. Lying within this annular space is a second ring 37 of insulating material that is attached to lugs 38 on plate 32, such lugs projecting through arcuate recesses 39 in the main plate 1. Accordingly, rotation of plate 32, through the medium of handle 33, will serve to correspondingly rotate said insulating ring 37. Carried by posts 40 projecting from the rear face of said insulating ring 37 is a segmental plate 41 that constitutes the movable contact member, such plate being formed with a series of knobs 42 that constitute the contacts proper. Springs 43 are desirably interposed between these knobs and the insulating ring 37 in order to insure proper engagement of such contacts with the stationary contacts 45 in the insulating ring 35. The disposition of such stationary contacts and the manner in which they are connected up will, it is believed, be found sufficiently indicated in Fig. 4, it being understood that a suitable conductor forms a permanent electrical connection between binding post 26 and a post 46 that is mounted like contacts 45 in insulating ring 35.

As will be seen upon referring to Fig. 7, a relatively slight advance movement of the nut 16 will serve to close the ignition circuit by bringing the shell or band 29 against contacts 25a and 26a, but the corresponding movement imparted to the actuating member 21 may, and preferably will be, insufficient to unlock the car. It will accordingly be possible to leave the motor running and yet lock the car, or to start the motor by thus turning on the ignition and still leave the car locked.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention.

1. In mechanism of the character described, the combination of a reciprocable lock-actuating member, manually operable means movable relative thereto for reciprocating said member, and an ignition circuit switch arranged coaxially with said manually operable means and controlled by said member.

2. In mechanism of the character described, the combination of a reciprocable lock-actuating member, key-controlled, manually operable means for reciprocating said member, and an ignition circuit switch arranged coaxially with said manually operable means and controlled by said member.

3. In mechanism of the character described, the combination of a reciprocable lock-actuating member, manually operable means movable relative thereto for reciprocating said member, relatively stationary contacts arranged coaxially with said manually operable means and forming part of an ignition circuit, and a conductor carried by said reciprocable member and adapted in one position thereof to bridge said contacts.

4. In mechanism of the character described, the combination of a reciprocable lock-actuating member, a manually operable rotatable member having threaded engagement with said first-named member for reciprocating same, relatively stationary contacts forming part of an ignition circuit, and a conductor carried by said reciprocable member and adapted in one position thereof to bridge said contacts.

5. In mechanism of the character described, the combination of a reciprocable lock-actuating member, a key-controlled rotatable member, stationary contacts arranged coaxially with said manually operable means and forming part of an ignition circuit, and a conductor carried by said reciprocable member and adapted in one position thereof to bridge said contacts.

6. In mechanism of the character described, the combination with a housing, a manually-controlled lock member rotatably mounted therein, a member to the rear of said lock member to be guided on and moved thereby and being substantially closed at its inner end, means engaging said last-named member whereby the latter is reciprocated upon rotation of said lock member, and a non-collapsing connector-actuator for a remote member, said actuator being headed in the closed end of the last-named member and extending therefrom to a point beyond said housing.

7. In mechanism of the character described, the combination with a housing, a threaded member rotatably mounted therein, a lock in said housing controlling rotation of said member, a member substantially closed at its inner end and having guided engagement with said threaded member, means aligning said last-named member whereby the latter is reciprocated upon rotation of said threaded member, and a non-collapsing push-pull actuator for a remote member, said actuator being headed in the closed end of the last-named member and extending therefrom to a point beyond said housing.

8. In mechanism of the character described, the combination with a support adapted for external attachment, a housing secured at one end to said support, a conduit attached to the other end of said housing, an externally threaded member rotatably mounted on and projecting from said support within said housing, a nut slidably guided in said housing and engaging said member, whereby said nut is reciprocated upon rotation of said member, and a suitable connector for actuating a remotely situate part guided in said conduit and attached at one end to said nut.

CARL W. BLOSSOM.
ELMER C. PETERSON.